US 8,015,878 B2

(12) United States Patent
Melikechi et al.

(10) Patent No.: US 8,015,878 B2
(45) Date of Patent: Sep. 13, 2011

(54) FIBER OPTICS SOUND DETECTOR

(75) Inventors: Noureddine Melikechi, Dover, DE (US); Aristides Marcano Olaizzola, Dover, DE (US)

(73) Assignee: Delaware State University Foundation, Inc., Dover, DE (US)

( * ) Notice: Subject to any disclaimer, the term of this patent is extended or adjusted under 35 U.S.C. 154(b) by 0 days.

(21) Appl. No.: 12/444,359

(22) PCT Filed: Oct. 4, 2007

(86) PCT No.: PCT/US2007/021294
§ 371 (c)(1),
(2), (4) Date: Feb. 15, 2010

(87) PCT Pub. No.: WO2008/045274
PCT Pub. Date: Apr. 17, 2008

(65) Prior Publication Data
US 2010/0139405 A1    Jun. 10, 2010

Related U.S. Application Data

(60) Provisional application No. 60/849,713, filed on Oct. 5, 2006.

(51) Int. Cl.
*G01B 9/02* (2006.01)
(52) U.S. Cl. ....................................................... 73/657
(58) Field of Classification Search .................. None
See application file for complete search history.

(56) References Cited

U.S. PATENT DOCUMENTS

| 4,162,397 A | 7/1979 | Bucaro et al. |
| 4,297,887 A | 11/1981 | Bucao |
| 4,363,114 A | 12/1982 | Bucaro et al. |
| 4,854,706 A | 8/1989 | Claus et al. |
| 6,483,619 B1 | 11/2002 | Greywall |

FOREIGN PATENT DOCUMENTS

| DE | WO/2008/045274 A3 | 4/2008 |
| WO | WO 02/077575 | 10/2002 |
| WO | PCT/US2007/021294 | 4/2009 |

OTHER PUBLICATIONS

Escalona, et al., "Interferometric and Z-Scan Techniques for Thermal Lensing Characterization," *V Latin American and Caribbean Congress on Fluid Mechanics*, Universidad Simon Bolivar, May 14-17, 2001, pp. 1-6.

(Continued)

*Primary Examiner* — Robert Raevis
(74) *Attorney, Agent, or Firm* — RatnerPrestia

(57) ABSTRACT

An optical sound detection system including: a laser source to generate a laser beam; an optical fiber; an optical sensor aligned to detect a detected portion of a diffraction pattern formed by the laser light emitted from the output coupling port of the optical fiber; and a signal processor to process the signal produced by the optical sensor. The optical fiber includes: a core that includes a photoelastically active material; an input coupling port optically coupled to the laser source to couple the laser beam into the core of the optical fiber; and an output coupling port from which the laser light is emitted after propagating through the core. The optical sensor is adapted to produce a signal corresponding to the detected portion of the diffraction pattern.

23 Claims, 5 Drawing Sheets

OTHER PUBLICATIONS

O. Marcano, et al., "High-sensitivity absorption measurement in water and glass samples using a mode-mismatched pump-probe thermal lens method," *Applied Physics Letters*, 78(22):3415-3417, May 28, 2001.

O. Marcano, et al., "Optical fiber device for human voice detection," *Proc. Of SPIE*, vol. 6004, No. 1, Oct. 24, 2005, pp. 60040O-1-7.

Rigrod, et al., "Wide-Band Microwave Light Modulation," *Proceedings of the IEEE*, pp. 137-140, Jan. 1963, 5 pages.

Sheik-Bahae, et al., "Sensitive Measurement of Optical Nonlinearities Using a Single Beam," *Journal of Quantum Electronics*, 26(4):760-769, Apr. 1990.

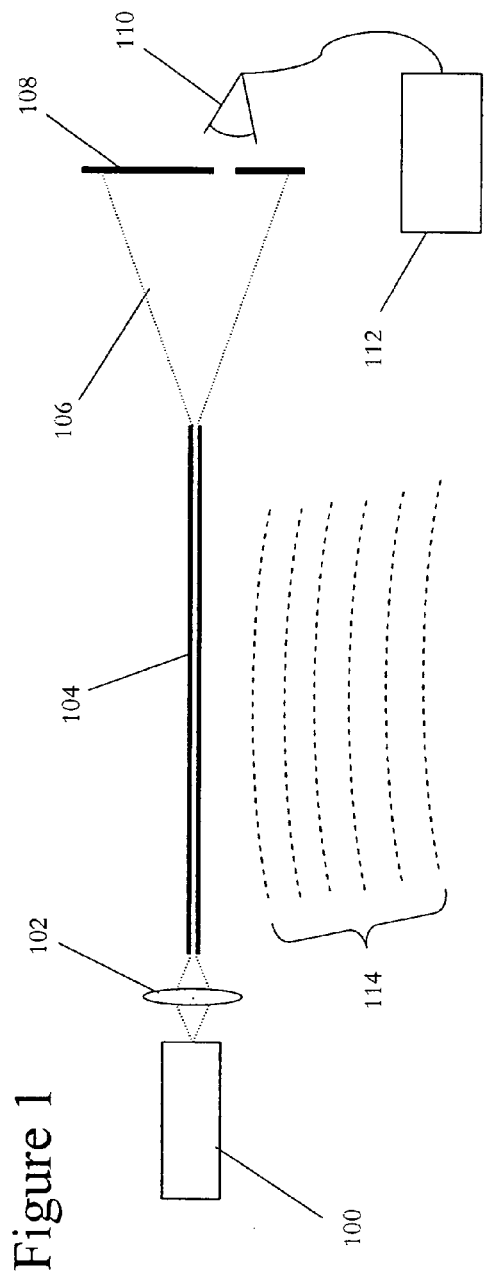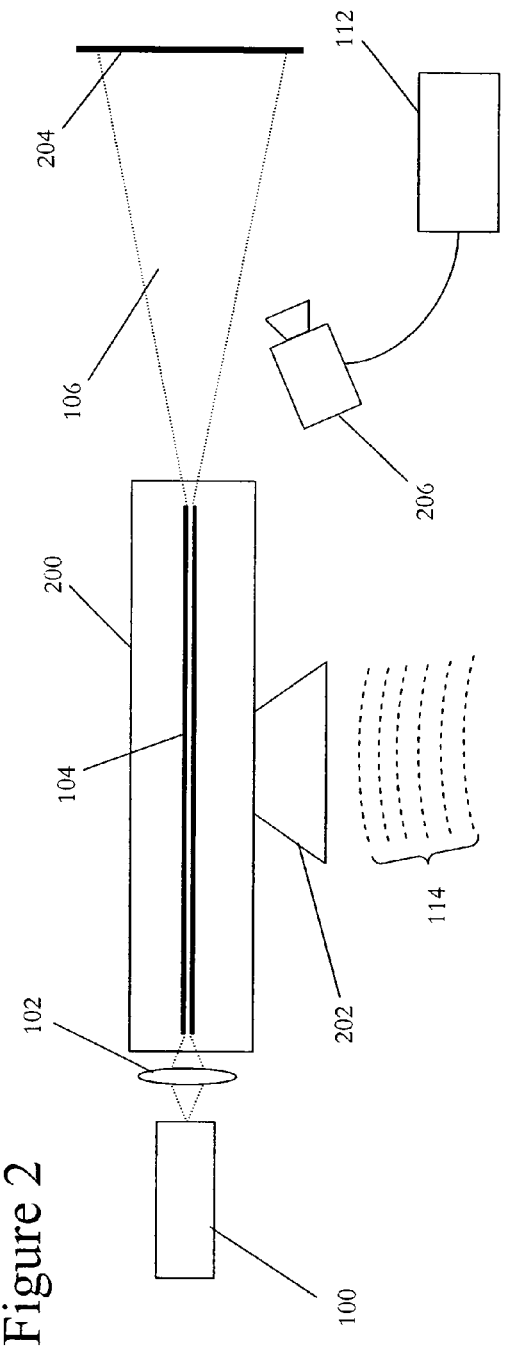

FIBER OPTICS SOUND DETECTOR

This application claims priority of International Patent Application No. PCT/US2007/021294, filed Oct. 4, 2007, which claims priority from, U.S. Provisional Patent Application No. 60/849,713, filed Oct. 5, 2006, both of which are herein incorporated by reference.

FIELD OF THE INVENTION

The present invention concerns an optical sound detection system. In particular, the devices of the present invention may allow for high sensitivity sound detection over a bandwidth that may extend far beyond the range of prior art mechanical and electro-mechanical sound detection systems.

BACKGROUND OF THE INVENTION

The detection of sound waves and vibrations has applications in a large variety of fields including, but not limited to, medicine, civil engineering, geography, oceanography, music, security, and rescue missions.

Exemplary embodiments of the present invention include optical sound detection systems that may be used for applications in these fields and more.

SUMMARY OF THE INVENTION

An exemplary embodiment of the present invention is an optical sound detection system including: a laser source to generate a laser beam; an optical fiber; an optical sensor aligned to detect a detected portion of a diffraction pattern formed by the laser light emitted from the output coupling port of the optical fiber; and a signal processor to process the signal produced by the optical sensor. The optical fiber includes: a core that includes a photoelastically active material; an input coupling port optically coupled to the laser source to couple the laser beam into the core of the optical fiber; and an output coupling port from which the laser light is emitted after propagating through the core. The optical sensor is adapted to produce a signal corresponding to the detected portion of the diffraction pattern.

Another exemplary embodiment of the present invention is an ultrasonic system including: an ultrasonic generator to generate an ultrasound signal; a plurality of optical ultrasonic detectors to detect portions of the ultrasound signal reflected by a test sample; and a signal processor to process electrical signals produced by the optical ultrasonic detectors. The ultrasonic generator is adapted to transmit an ultrasound signal into the test sample. Each optical ultrasonic detector includes: a laser source to generate a laser beam; an optical fiber; and an optical sensor aligned to detect a portion of a diffraction pattern formed by the laser light emitted from the output coupling port of the optical fiber. The optical fiber includes: a core that includes a photoelastically active material; an input coupling port optically coupled to the laser source to couple the laser beam into the core of the optical fiber; and an output coupling port from which the laser light is emitted after propagating through the core. The optical sensor is adapted to produce an electrical signal corresponding to the detected portion of the diffraction pattern. The signal processor also generates an ultrasound image of the test sample.

A further exemplary embodiment of the present invention is a personal medical monitoring device including: an optical sound detector adapted to be acoustically coupled to a person; a signal processor to process a signal produced by the optical sound detector and identify at least one predetermined signal feature in the signal; and at least one of a transmitter or an indicator electrically coupled to the signal processor. Each predetermined signal feature identified by the signal processor corresponds to detection of a sound associated with a medical condition. The optical sound detector includes: a laser source to generate a laser beam; an optical fiber; a rigid substrate coupled to the optical fiber to increase coupling of sounds from the person into the optical fiber; and an optical sensor aligned to detect a detected portion of a diffraction pattern formed by the laser light emitted from the output coupling port of the optical fiber. The optical fiber includes: a core that includes a photoelastically active material; an input coupling port optically coupled to the laser source to couple the laser beam into the core of the optical fiber; and an output coupling port from which the laser light is emitted after propagating through the core. The optical sensor is adapted to produce a signal corresponding to the detected portion of the diffraction pattern. The transmitter generates and transmits a warning signal when a predetermined signal feature is identified by the signal processor. The indicator produces a warning indication when a predetermined signal feature is identified by the signal processor.

An additional exemplary embodiment of the present invention is a structural vibration detection system including: an optical sound detector; a signal processor to process the signal produced by the optical sound detector and identify at least one predetermined signal feature in the signal; and at least one of a transmitter or an indicator electrically coupled to the signal processor. Each predetermined signal feature corresponds to detection of a sound associated with a specific structural condition. The optical sound detector includes: a laser source to generate a laser beam; an optical fiber adapted to be acoustically coupled to a structure; and an optical sensor aligned to detect a detected portion of a diffraction pattern formed by the laser light emitted from the output coupling port of the optical fiber. The optical fiber includes: a core that includes a photoelastically active material; an input coupling port optically coupled to the laser source to couple the laser beam into the core of the optical fiber; and an output coupling port from which the laser light is emitted after propagating through the core. The optical sensor is adapted to produce a signal corresponding to the detected portion of the diffraction pattern. The transmitter generates and transmits a warning signal when a predetermined signal feature is identified by the signal processor. The indicator displays a warning indication when a predetermined signal feature is identified by the signal processor.

Yet another exemplary embodiment of the present invention is an active sonar system including: a sonar signal generator to generate and transmit a sonar signal; an optical sonar detector to detect reflected portions of the sonar signal; and a signal processor to process the electrical signal produced by the optical sonic detector. The optical sonar detector includes: a laser source to generate a laser beam; an optical fiber; and an optical sensor aligned to detect a detected portion of a diffraction pattern formed by the laser light emitted from the output coupling port of the optical fiber. The optical fiber includes: a core that includes a photoelastically active material; an input coupling port optically coupled to the laser source to couple the laser beam into the core of the optical fiber; and an output coupling port from which the laser light is emitted after propagating through the core. The optical sensor is adapted to produce an electrical signal corresponding to the detected portion of the diffraction pattern. The signal processor also generates a sonar image.

Yet a further exemplary embodiment of the present invention is a seismograph including: an optical vibration detector adapted to be acoustically coupled to the ground; and a signal processor to process the signal produced by the optical vibration detector. The optical vibration detector includes: a laser source to generate a laser beam; an optical fiber; a rigid substrate coupled to the optical fiber to increase coupling of vibrations from the ground into the optical fiber; and an optical sensor aligned to detect a detected portion of a diffraction pattern formed by the laser light emitted from the output coupling port of the optical fiber. The optical fiber includes: a core that includes a photoelastically active material; an input coupling port optically coupled to the laser source to couple the laser beam into the core of the optical fiber; and an output coupling port from which the laser light is emitted after propagating through the core. The optical sensor is adapted to produce a signal corresponding to the detected portion of the diffraction pattern.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawing are the following figures:

FIG. 1 is a side plan drawing illustrating an exemplary optical sound detection system according to the present invention.

FIG. 2 is a side plan drawing illustrating another exemplary optical sound detection system according to the present invention.

DETAILED DESCRIPTION OF THE INVENTION

Figure 3:
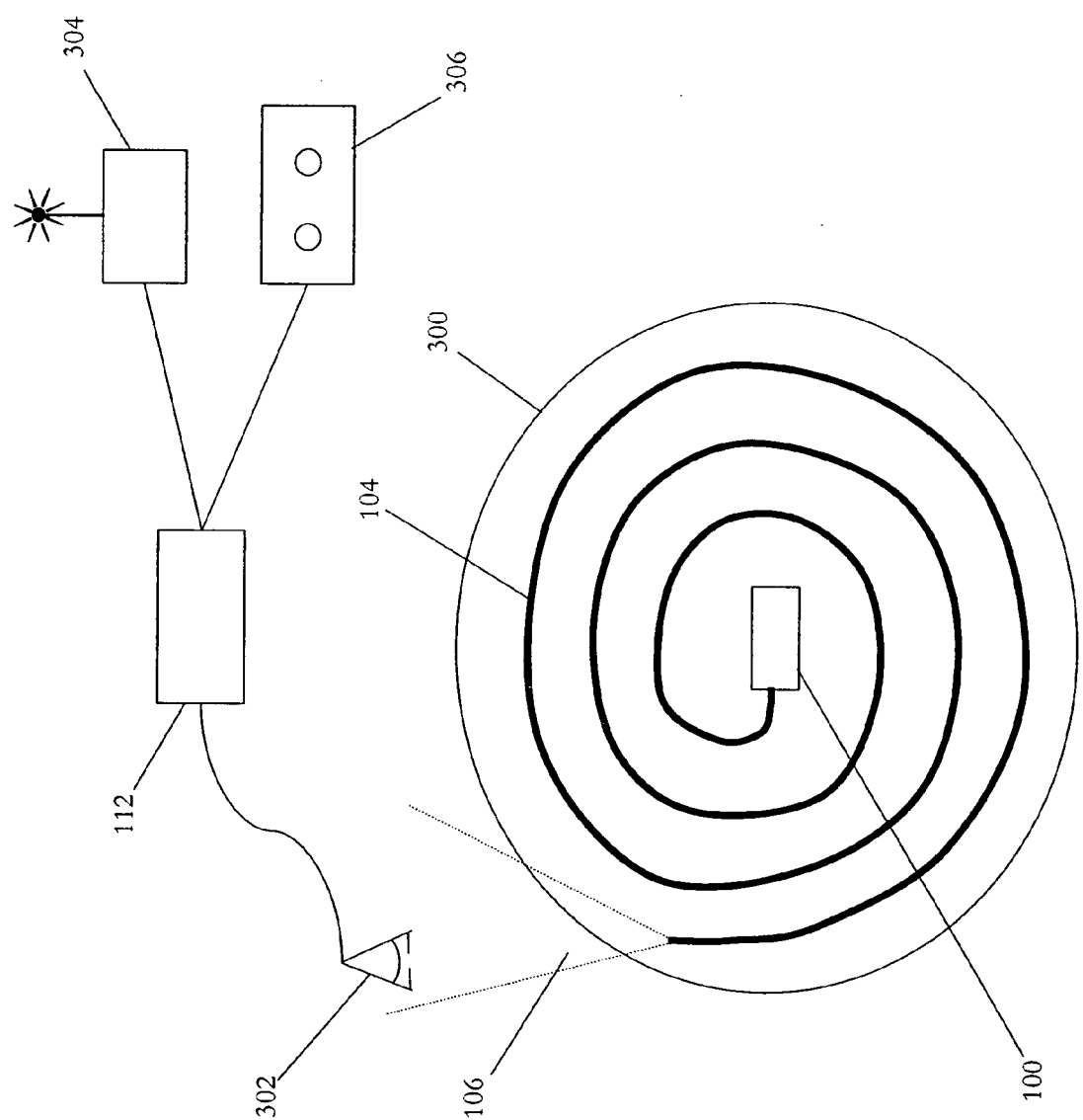
FIG. 3 is a side plan drawing illustrating a further exemplary optical sound detection system according to the present invention.

Exemplary embodiments of the present invention include numerous optical sound detection systems, such as microphones, stethoscopes, ultrasonic detectors, personal medical monitoring devices, structural vibration sensors, intrusion detectors, sonar detectors, and seismographs.

The exemplary embodiments of the present invention also include the many applications of these optical sound detection systems. Optical sound detection systems for medical applications may include devices that are able to detect low power acoustic sources, such as heartbeat, circulating blood, and fetal sounds. Applications to acoustic imaging, such as ultrasound systems and active and passive sonar systems, are also proposed.

Optical fibers have previously been used for sound detection. Changes in signal amplitude, state of polarization, frequency, and phase have been used in different design of fiber optics detectors. The photo-elastic phase changes induced by sound wave are usually small and, as a consequence, special designs have been used in these prior systems to detect them.

The most sensitive of these devices are based on the principles of detection of shift in the phase of the light wave. Optical phase detection is a particularly sensitive experimental method. Interference schemes and Bragg grating diffraction have been used in successful designs. However, these detectors use special recording and relatively complex elaboration and processing.

Exemplary optical sound detection systems according to the present invention use both photoelastic effects within an optical fiber and diffraction effects that occur at the output end of an optical fiber. The transmission of pressure waves (i.e. sound or acoustic fields) through a material causes portions of that material to be alternately compressed and then stretched. In many optical materials this successive stretching and compressing leads to an oscillation of the index of refraction of the material. This is known as the photoelastic effect. Because of the photoelastic effect, light that propagates through an optical fiber in an acoustic field receives a varying phase shift that is correlated to the acoustic field. The effect accumulates along the fiber during light propagation.

Because light may follow a multitude of paths through the optical fiber, light exiting the output end of an optical fiber exhibits a complex diffraction pattern. The amplitude field distribution of the diffracted field depends strongly on the phase of the light. The varying phase shift induced by the acoustic field (through the photoelastic effect) alters this diffraction pattern. These alterations are correlated to the acoustic field. Thus, properties of the acoustic field (i.e. sound) may be detected and measured in the alterations of the diffraction pattern. Mathematical Derivations, below, explains the physics involved in greater detail.

One approach used to detect and measure these alterations, illustrated in FIG. 1, uses aperture 108 to transmit only a small portion of diffraction pattern 106 to optical sensor 110. Changes of the intensity of this small portion of the diffraction pattern are proportional to the phase changes in the light and may be detected and recorded with relative ease. The detected signal may be filtered to remove its DC components and then amplified before sending it to a sound recording or reproduction system.

Changes in a refractive index of the order of $10^{-7}$ and better have been detected using exemplary devices according to the present invention. Thus, this sensitivity is similar to the sensitivity of more complicated interferometric methods. The sensitivity of this device is sufficient to detect the small phase changes generated by such acoustic sources as a voice, heartbeat, circulating blood, or a fetus, on a single optical fiber. No special treatment or special structure for the fiber is required for this detector to work. Exemplary embodiments of the present invention may use either multimode or single mode fibers As illustrated in Mathematical Derivations, the sensitivity of an optical sound detection system according to the present invention depends on the cube of the length of the portion of the optical exposed to the acoustic field. Therefore, the sensitivity may span an extremely large range. It is noted, however, that the sensitivity exemplary systems according to the present invention does not depend significantly on the wavelength of the sound waves (or the ratio of this wavelength to any dimension of the fiber). Thus, these exemplary systems may detect both ultrasound and infrasound.

FIG. 1 illustrates an exemplary optical sound detection system according to the present invention that may be used to detect acoustic field 114. Acoustic field 14 is depicted as incident on optical fiber 104 from only one direction for illustrative purposes only and is not intended to be limiting.

This exemplary optical sound detection system includes: laser source 100 to generate a laser beam; optical fiber 104 to transmit the laser beam; optical sensor 110 aligned to detect a detected portion of diffraction pattern 106 formed by the laser light emitted from the output coupling port of optical fiber 104; and signal processor 112 to process a signal produced by optical sensor 110.

Laser source 100 may be any type of laser source; however, for a number of applications in which a smaller size is desirable, a diode or fiber laser may be desired.

The core of optical fiber 104 includes a photoelastically active material. Glass, fused quartz, and plastics commonly used in optical fiber exhibit sufficient photoelasticity to be used as the core of optical fiber 104. The length of optical fiber 104 may be determined based on the desired sensitivity of the system and the photoelastic constant of the core material. As described in Example 1, the inventors have shown experimentally that an optical microphone according to the present invention that includes a 1 m long glass fiber with a 200 µm diameter is sufficiently sensitive to detect a human voice. It is noted that, although FIG. 1 illustrates optical fiber 104 in a laid out straight, longer fibers may be wrapped in a coil or other path to reduce the dimensions of the optical sound detection device, assuming that the fiber is not bent so sharply that it becomes undesirably lossy.

The input port of optical fiber 104, which couples the laser beam into the optical fiber core, may include optics, such as lens 102, to focus the laser beam onto one end of optical fiber 104. Alternatively, optical fiber 104 may be butted up to the output port of laser source 100. If laser source 100 is a fiber laser optical fiber 104 may be monolithic formed with laser source 100 or these elements may be two separate fibers that are spliced or otherwise coupled using standard techniques. In the case of a monolithic construction, the input port of optical fiber 104 is the portion of the monolithic fiber adjacent to the grating of the fiber laser.

The output coupling port of the optical fiber may be just the cleaved to output end of the core of optical fiber 104, as shown in FIG. 1. However it may also include other optical elements (such as mirrors, prisms; and/or lenses) to redirect the portion of diffraction pattern 106 to be detected and/or to control the dispersion of this portion.

In an exemplary embodiment of the present invention, as shown in FIG. 1, optical sensor 110 may be a single photodetector adapted to produce a signal corresponding to the detected portion of the diffraction pattern. A separate aperture 108 may be used to limit the portion of the diffraction pattern incident on photodetector 302. Alternatively, as illustrated in FIG. 3, the integral aperture of photodetector 302 may be used to mask the undesired portions of the diffraction pattern. It is noted that the hole in aperture 108 is shown to be off the central axis of diffraction pattern 106. This location is merely illustrative and is not intended to be limiting.

The optical sensor may desirably detect the power of the detected portion of the diffraction pattern and produce a signal with an amplitude that is proportional to the power of the detected portion of the diffraction pattern. In addition to the signal amplitude, signal processor 112 may process this signal to determine spectral components of the signal amplitude. Signal processor 112 may perform any standard filtering and/or noise reduction procedures. In some exemplary applications, signal processor 112 may further be used to identify one or more predetermined signal features in the signal that corresponds to detection of specific sound(s) or vibration(s). These sound(s) or vibration(s) may be indicative or predictive of specific situations. For example, the signal processor of an exemplary personal medical monitoring device according to the present invention may be adapted to identify a feature in the signal indicative of tachycardia. It is contemplated that these signal features may involve amplitude patterns and/or spectral patterns in the signal.

Signal processor 112 may include various components, such as a digital signal processor (DSP), a general-purpose processor programmed to perform the desired signal processing, a special purpose processor, special purpose circuitry, and/or an application specific integrated circuit (ASIC).

FIG. 2 illustrates another exemplary optical sound detection system according to the present invention that includes several alternative features. In this exemplary embodiment, optical fiber 104 is mounted in resonant chamber 200. A resonant structure such as resonant chamber 200 may be used to selectively increase the sensitivity of exemplary optical sound detection system to specific frequencies and/or bands of sound waves. More complicated shapes that the rectangular box shown in FIG. 2 may be used for resonant chamber 200. Resonant chamber 200 may be filled with various gasses, liquids, or solids depending on its desired spectral features.

The exemplary embodiment of FIG. 2 also includes sound horn 202, which is arranged so as to selectively increase coupling of sound vibrations incident on its mouth into the optical fiber, i.e. in the illustration of FIG. 2 sound waves propagating up the center of the sheet.

Further, the exemplary embodiment of FIG. 2 includes an alternative optical sensor structure. In this alternative exemplary optical sensor structure, laser light emitted from the output coupling port of optical fiber 104 is incident on surface 204 such that diffraction pattern 106 is formed on the surface. A photodetector may be optically coupled to an area of surface 204 to detect the portion of the diffraction pattern formed thereon. If surface 204 is translucent this optical coupling may be from the front, as shown in FIG. 2, or from the back.

It is noted, however, that the exemplary embodiment of FIG. 2 includes digital camera 206 instead of a single photodetector, as illustrated in FIG. 1. Thus, in this exemplary embodiment the optical sensor includes a plurality of photodetector pixels. Each of these photodetector pixels may be focused on a different area of surface 204 to detect the power of different sub-portions of the diffraction pattern. The signal produced by digital camera 206 includes a plurality of sub-signals corresponding to the photodetector pixels. The amplitude of each sub-signal is desirably proportional to the power of the corresponding sub-portion of the diffraction pattern.

Signal processor 112 may process the sub-signals from different pixels separately. Alternatively, signal processor 112 may perform comparative processing between different sub-signals. For example, signal processor 112 may determine an amplitude difference between two of the sub-signals and then process this amplitude difference, possibly determining the spectral components of the amplitude difference.

FIG. 3 illustrates a further exemplary embodiment of the present invention. Among other possible applications, the exemplary optical sound detection system illustrated in FIG. 3 may be desirable for use as a personal medical monitoring device or a structural vibration detection system. Examples of structures that may be monitored by a structural vibration detection system according to the present invention include bridges, buildings, vehicles, rails, and pipelines.

In this exemplary embodiment, laser source 100 is illustrated as being directly butted up to the input coupling port of optical fiber 104. Optical fiber 104 is mounted on element 300 in a spiral pattern. Element 300 may be a flexible membrane coupled to optical fiber 104 to increase coupling of sound vibrations that are incident on the flexible membrane into the optical fiber. Used in this manner, a flexible membrane may merely couple sound energy from a large area into optical fiber 104. Additionally a flexible membrane may function as a resonant structure to selectively increase the couple of certain acoustic frequencies and/or bands into optical fiber 104.

Alternatively, element 300 may be a rigid substrate coupled to optical fiber 104 to increase coupling of vibrations into it. As in the case of a flexible membrane, a rigid substrate may function as a resonant structure in addition to increasing the total coupled acoustic energy. A rigid substrate may also desirably provide mechanical stability to the exemplary optical sound detection system. It is noted that, if element 300 is a rigid substrate, photodetector 302 may be mounted on this element as well, rather than separate as shown in FIG. 3. Further it is noted that the inclusion of a rigid substrate may be desirable for applications, such as stethoscopes, structural vibration detection systems, ultrasonic detectors, and seismographs, in which the principle aim of the exemplary optical sound detection system is the detection of vibrations within a solid body.

If the exemplary optical sound detection system of FIG. 3 is employed as a personal medical monitoring device it may be desirable for element 300 to be coupled to the person to be monitored. Likewise, if the exemplary optical sound detection system of FIG. 3 is employed as a structural vibration detection system it may be desirable for element 300 to be coupled to the structure to be monitored.

The exemplary embodiment of FIG. 3 also includes transmitter 304 and indicator 306 which are electrically coupled to signal processor 112. In the case of both a personal medical monitoring device and a structural vibration detection system, it may be desirable to include one or both of transmitter 304 and indicator 306 to warn that signal processor 112 has identified a predetermined signal feature. Examples of signal features that may desirably be identified by signal processor 112 are signal features corresponding to cardiac arrhythmia; tachycardia; cardiac arrest; or apnea, for a personal medical monitoring device.

Transmitter 304 may generate and transmit a warning signal to a remote location when signal processor 112 identifies a predetermined signal feature. Indicator 306 may produce a warning indicator when signal processor 112 identifies a predetermined signal feature. This warning indicator may take any one of several forms. For example, it may be a steady or flashing light, as shown in FIG. 3. Alternatively, the warning indicator may be a visible warning message, an alarm, or an audible warning message.

Figure 4:
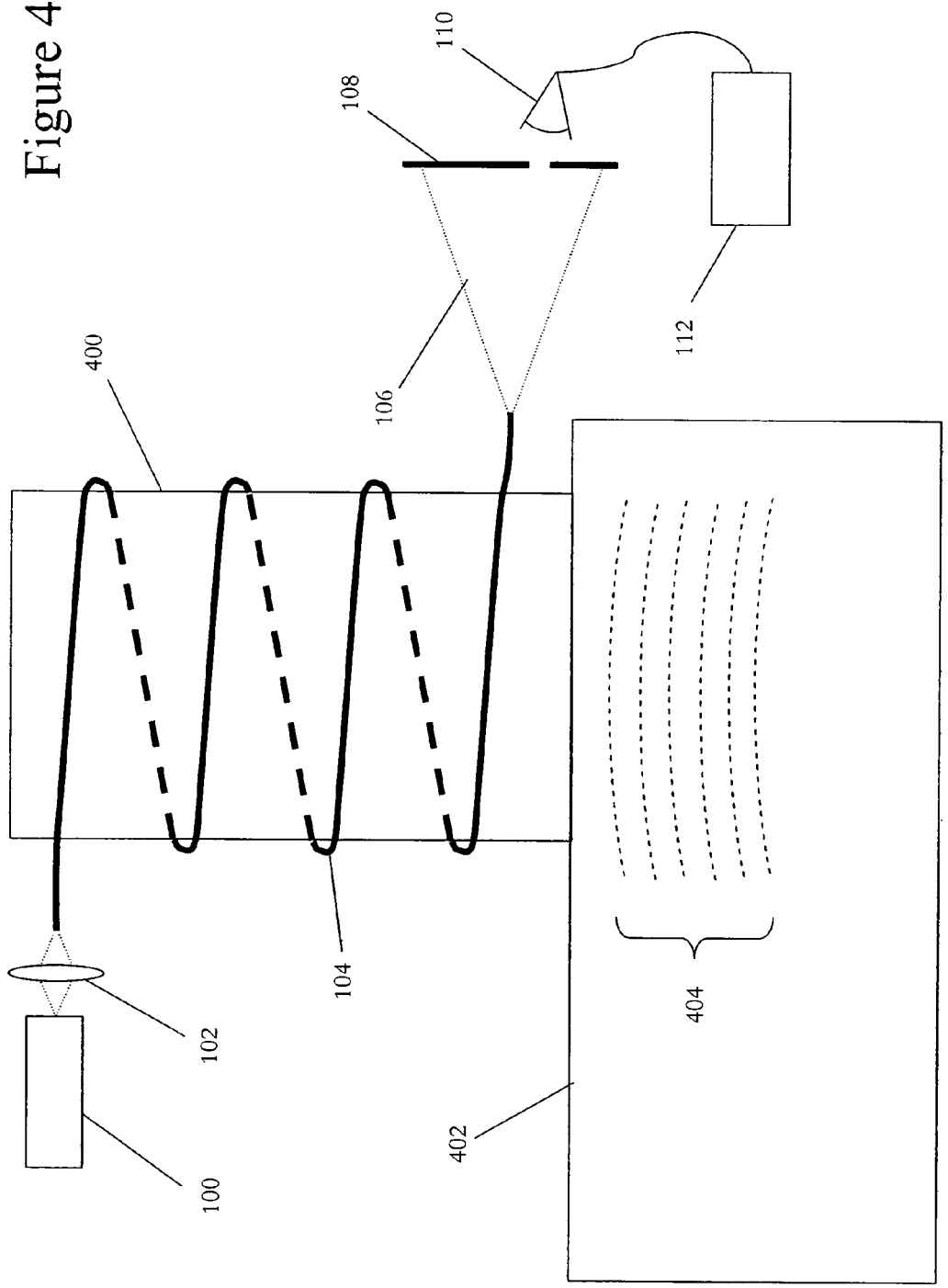
FIG. 4 is a side plan drawing illustrating an additional exemplary optical sound detection system according to the present invention.

FIG. 4 illustrates another exemplary optical sound detection system according to the present invention. This exemplary embodiment of the present invention may be particularly useful in applications, such as stethoscopes, structural vibration detection systems, ultrasonic detectors, and seismographs, in which the principle aim of the exemplary optical sound detection system is the detection of vibrations within a solid body.

In this exemplary embodiment, optical fiber 104 is wrapped around rigid rod 400, which may then be desirably brought into contact with body 402 to preferentially detect vibrations 404 that are propagating with body 402 as opposed to sound waves in the surrounding gas (or liquid). In the case of a seismograph, body, 402 is desirably bedrock and, in the case of structural vibration detection system, body 402 is desirably the structure to be monitored.

In FIG. 4, rigid rod 400 is illustrated as being cylindrical; however, this is merely illustrative and is not intended to be limiting. Also, it is noted that, in addition to increasing the coupling of acoustic energy into optical fiber 104, rigid rod 400 may function as resonant structure, depending on it dimensions and rigidity.

Figure 5:
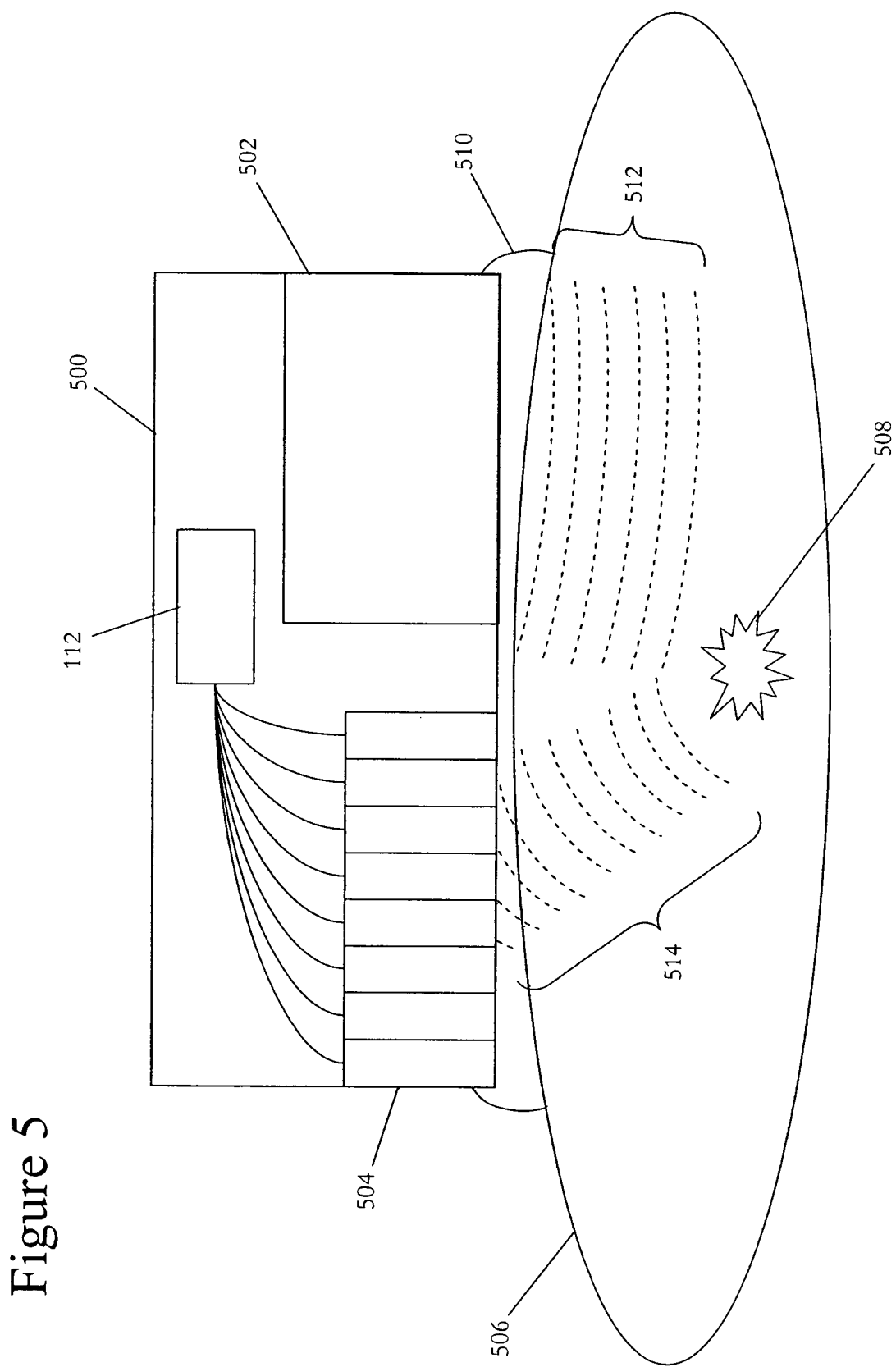
FIG. 5 is a side plan drawing illustrating yet another exemplary ultrasound system according to the present invention.

FIG. 5 illustrates exemplary ultrasound system 500 according to the present invention. This exemplary ultrasound system includes: ultrasonic generator 502 to generate ultrasound signal 512; a plurality of optical ultrasonic detectors 504 to detect portions of ultrasound signal 514 reflected by portion 508; and signal processor 112 to process the electrical signals produced by optical ultrasonic detectors 504 and generate an ultrasound image of test sample 506. Coupling of ultrasound into and out of test sample 506 may be improved by using gel 510.

Optical ultrasonic detectors 504 may be designed using any of the previously described exemplary optical sound detection systems. As noted above, with reference to the exemplary embodiments of FIGS. 3 and 4, it may desirable to use a rigid substrate and/or rigid rod to preferentially increase to acoustic coupling between the optical fiber and test sample 506. It may also be desirable to include a resonant structure in optical ultrasonic detectors 504 that has a resonant frequency substantially equal to the peak frequency of the ultrasound signal generated by ultrasonic generator 502

The ultrasound image of test sample 506 generated by signal processor 112 desirably indicates the location of portions of test sample 506, such as portion 508, that have different acoustic properties than the bulk of test sample 506. The generation of this ultrasonic image may be performed using any standard algorithms used in the ultrasound imaging arts. This ultrasound image may be stored, displayed, and/or printed.

Another exemplary embodiment of the present invention that is similar to the exemplary ultrasound system of FIG. 5 is an active sonar system. An exemplary active sonar system includes: a sonar signal generator to generate and transmit a sonar signal; one or more optical sonar detectors to detect reflected portions of the sonar signal; a signal processor to process the electrical signals produced by the plurality of optical sonic detectors and generate sonar images.

The present invention includes a number of exemplary embodiments of optical sound detection systems. Although the invention is illustrated and described herein with reference to specific embodiments, it is not intended to be limited to the details shown. Rather, various modifications may be made in the details within the scope and range of equivalents of the claims and without departing from the invention. In particular, one skilled in the art may understand that many features of the various specifically illustrated embodiments may be mixed to form additional exemplary optical sound detection system also embodied by the present invention.

Mathematical Derivations

To understand the use of light diffraction for high sensitivity acoustic detection in exemplary embodiments of the present invention, the propagation of a single light wave through a step index optical fiber is considered below in detail.

Figure 6:
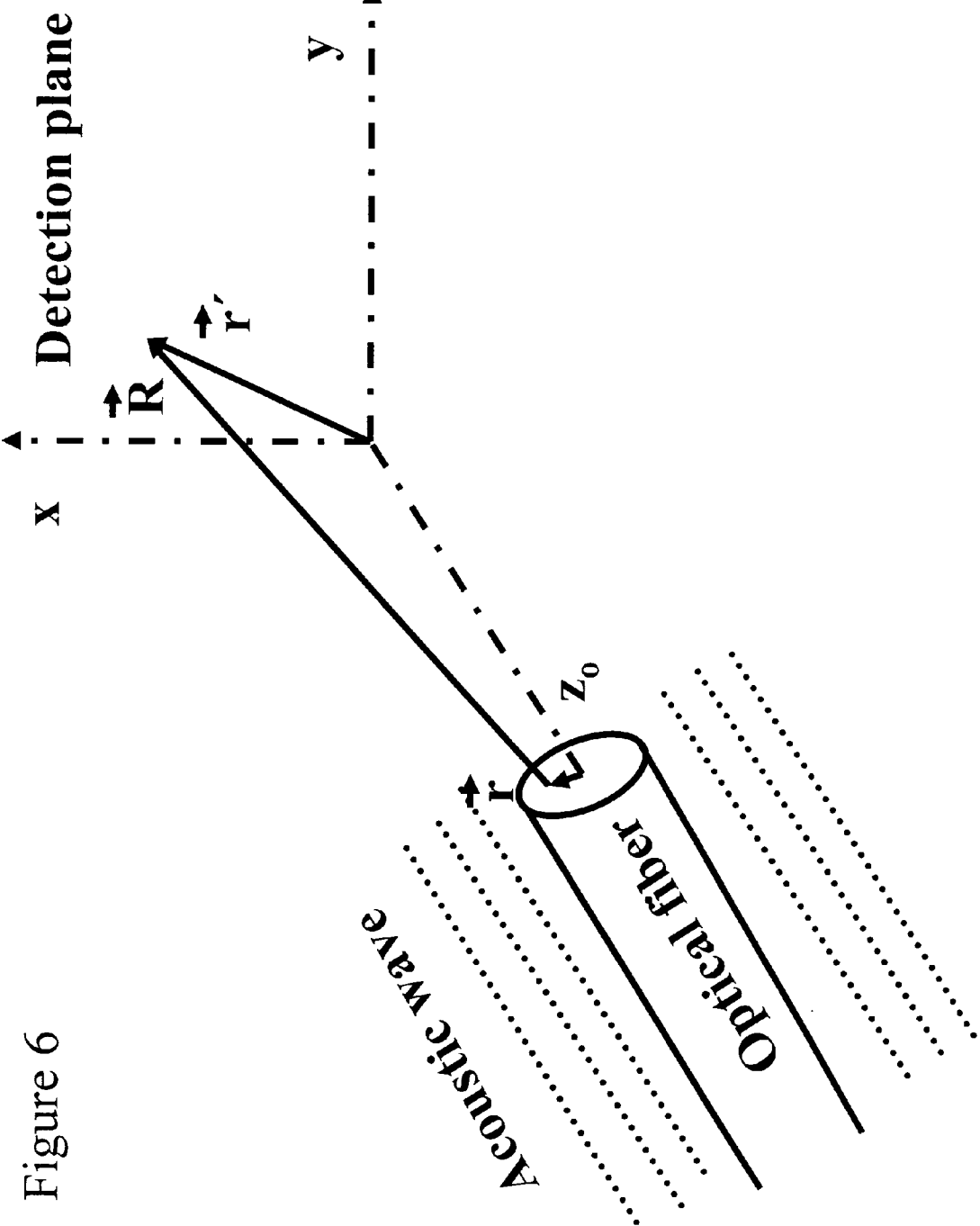
FIG. 6 is a perspective drawing illustrating axes used in calculation of diffraction patterns in Mathematical Derivations for an exemplary ultrasound system according to the present invention.

The fiber is exposed to an acoustic axial monochromatic wave of frequency $\omega_a$, wave-vector $k_a$, and acoustic strain amplitude $S_o$. FIG. 6 illustrates the optical fiber acoustic transducer. The change of the refraction index of the materials composing the optical fiber under the effect of this acoustic field is:

$$\Delta n = (pn^3/2) S_o \cos(\omega_a t - k_a r), \quad (1)$$

where p is the photo-elasticity coefficient and n the refraction index. The acoustic strain amplitude is related to the intensity of the acoustic wave $I_a$ through the relation:

$$S_o = (2I_a/\rho V_a^3)^{1/2} \quad (2)$$

where $\rho$ is the sample density and $V_a$ is the propagation speed of the acoustic wave in the medium. The intensity of an average human mechanical activity is the range of 40 db equivalent to $10^{-8}$ W/m$^2$. Considering the values for glass p=0.3, $\rho$=2500 Kg/m$^3$ and n=1.5, a refection index change $\Delta n$ induced by acoustic wave due to the photo-elasticity effect of the order of $10^{-11}$ is obtained.

The phase shift induced by the acoustic wave on the light wave propagating a distance L through the fiber is:

$$\Phi(r,t) = \Phi_o \cos(\omega_a t - k_a r), \quad (3)$$

where $\Phi_o = \pi L p n^3 S_o / \lambda$ and $\lambda$ is the light wavelength. Considering a 10 m long fiber and for $\lambda$=632 nm it is estimated that the human voice can in principle generate a phase shift of $2 \times 10^{-3}$ rad. Such small phase shifts can be easily detected using the well-known idea of the Z-scan technique. The idea is to detect small changes in the light transmission through a small aperture located at the far field. In this regard it is necessary to calculate the field amplitude of the light diffracted at the end of the optical fiber. The detection plane is located at a distance $Z_o$ from this fiber end. FIG. 6 shows a scheme of the diffraction experiment proposed. After the propagation of distance L through the fiber the light beam is diffracted at the fiber end. The diffracted field amplitude at the point r' at the detection plane (see FIG. 1) can be calculated using the Diffraction integral:

$$U(r', t) = ik \int_S U_o(r, t) \exp(-ikR - i\Phi(r, t))/R \, dS, \quad (4)$$

where, dS is the fiber element surface at the fiber end, $U_o(r,t)$ is the light field amplitude at the exit of the fiber optics, k is the light wave number, R is the vector distance between the point (x, y, 0) at the end of the fiber and the observation point (x', y', z').

Assuming that the field amplitude $U_o$ is near constant within the fiber, that the fiber radius is small compared to R and that the field amplitude is calculated at the distance $Z_o$ from the end of the fiber, the equation (4) reduces to:

$$U(z_o, t) = \quad (5)$$
$$2\pi i k U_o (\exp(-ikZ_o)/Z_o) \int_0^{r_o} \exp(-i\Phi_o \cos(\omega_a t - k_a r)) r \, dr,$$

Taking into account that $\phi_o \ll 1$, decomposing the exponent within the integral and also considering that usually $k_a r_o \ll 1$ it follows that:

$$U(z_o, t) = C(Z_o)(1 - i\Phi_o \cos(\omega_a t)), \quad (6)$$

where $C(Z_o) = \pi i k U_o r_o^2 (\exp(-ikZ_o)/Z_o)$. The calculation of the field amplitude in any other point of the detection plane is similar; however, it cannot be expressed by this simple formula. Then, finally, the detected intensity calculated in the same first order approximation in phase is:

$$|U(Z_o, t)|^2 = |C(Z_o)|^2 - Im(C(Z_o))\Phi_o \cos(\omega_a t), \quad (7)$$

The detected light transmission through a small aperture located at point $Z_o$ has a DC component proportional to the light intensity in the absence of the acoustic field and an AC component that reproduces the time dependence of the incoming acoustic wave.

The acoustic wave induces phase changes in the light wave that propagates through the fiber. These changes accumulate through all the fiber length. When the light is diffracted at the end of the fiber, the total phase change generate changes in the light field intensity at a given observation point. In this regard, the optical fiber is working as a phase detector. This property differentiates the proposed detector from the previous systems that usually measure amplitude changes of the light field that propagate through the fiber. Below it is shown that the sensitivity of the fiber when using as a phase detector is large enough for detection of human voice acoustic field.

EXAMPLE 1

Results from one experimental embodiment of an optical sound detection system according to the present invention.

Light from a CW He—Ne (632 nm) or a diode laser (645 nm) of an average power of 1 mW is sent into the optical fiber using a 10-cm focal length lens and an optical coupler. Several meters (2 to 50 m) of a multimode fiber of glass or plastic of relatively large diameter (0.2 to 1 mm) are used as the actual acoustic transducers. The fibers are extended over a specially designed structure or support. The light diffracted at the exit end of the fiber is directed toward an aperture and then to a diode detector. After the detector the signal is amplified by a current preamplifier and directed toward a final amplification stage VA before sending to the sound reproduction is system or an oscilloscope. For generating the acoustic field, a signal generator connected to a sound reproduction system is used.

The sensitivity of the proposed detector is large enough to allow the detection of human voice. A human voice was detected using 30 m of multimode glass fiber having a 200 μm diameter. A shorter fiber (1 m long) was found to be capable of detecting the human voice acoustic field as well, but with reduced sensitivity as would be expected.

What is claimed:
1. An optical sound or vibration detection system, the optical sound detection system comprising:
    a laser source for generating a laser beam;
    an optical fiber configured to receive a sound or vibration signal, the optical fiber comprising:
        a core that comprises a photoelastically active material;
        an input coupling port optically coupled to the laser source for coupling the laser beam into the core of the optical fiber; and
        an output coupling port for emitting laser light propagated through the core, the output coupling port configured to diffract the emitted laser light;
    an optical sensor at a detection plane spaced apart from the output coupling port and aligned to detect a portion of a diffraction pattern formed by the emitted laser light diffracted from the output coupling port of the optical fiber, the photoelastically active material of the optical fiber core adapted to modify the propagated laser light responsive to the sound or vibration signal such that the diffraction pattern is characteristic of the sound or vibration signal, the optical sensor adapted to produce a signal corresponding to the detected portion of the diffraction pattern; and
    a signal processor for processing the signal produced by the optical sensor.

2. A seismograph, the seismograph comprising:
an optical vibration detector adapted to be acoustically coupled to the earth, the optical vibration detector comprising the optical sound or vibration detection system of claim 1, further comprising a rigid substrate coupled to the optical fiber for increasing coupling of vibrations from the earth into the optical fiber; wherein the signal processor is configured to process the signal produced by the optical vibration detector.

3. The optical sound or vibration detection system of claim 1, wherein the optical sound detection system comprises one of:
a microphone;
a stethoscope;
a personal medical monitoring device;
a structural vibration sensor;
an intrusion detector; or
a seismograph.

4. An optical sound or vibration detection system of claim 1, wherein the input coupling port of the optical fiber comprises converging optics for focusing the laser beam on an input end of the core of the optical fiber.

5. An optical sound or vibration detection system of claim 1, wherein the output coupling port of the optical fiber comprises at least one of: a cleaved output end of the core of the optical fiber; a mirror; a prism; or a lens.

6. An optical sound or vibration detection system of claim 1, wherein the optical sensor comprises:
a photodetector; and
an aperture aligned In the laser light emitted from the output coupling port of the optical fiber such that only the detected portion of the diffraction pattern is incident on the photodetector.

7. An optical sound or vibration detection system of claim 1, wherein the optical sensor comprises:
a surface aligned in the laser light emitted from the output coupling port of the optical fiber such that the diffraction pattern is formed on the surface; and
a photodetector optically coupled to an area of the surface on which the detected portion of the diffraction pattern is formed.

8. An optical sound or vibration detection system of claim 1, wherein:
the optical sensor is configured for detecting a power of the detected portion of the diffraction pattern;
an amplitude of the signal produced by the optical sensor is proportional to the power of the detected portion of the diffraction pattern; and
the signal processor is configured to process the signal to determine spectral components of the amplitude.

9. An optical sound or vibration detection system of claim 1, wherein:
the optical sensor comprises a plurality of photodetector pixels;
each photodetector pixel is configured to detect a power of a sub-portion of the detected portion of the diffraction pattern; and
the signal produced by the optical sensor comprises a plurality of sub-signals corresponding to the plurality of photodetector pixels, each sub-signal having an amplitude proportional to the power of the corresponding sub-portion of the detected portion of the diffraction pattern.

10. An optical sound or vibration detection system of claim 9, wherein the signal processor is configured for processing the signal to:
determine an amplitude difference between two of the sub-signals; and
determine spectral components of the amplitude difference.

11. An optical sound or vibration detection system of claim 1, wherein:
the signal processor is configured for processing the signal for identification of at least one predetermined signal feature in the signal.

12. The optical sound or vibration detection system of claim 11, further comprising:
a transmitter electrically coupled to the signal processor for generating and transmitting a warning signal when one of the at least one predetermined signal feature is identified by the signal processor; or
an indicator electrically coupled to the signal processor for displaying a warning indication when one of the at least one predetermined signal feature is identified by the signal processor.

13. A personal medical monitoring device, the personal medical monitoring device comprising:
the optical sound or vibration detection system of claim 12, adapted to be acoustically coupled to a person, wherein the optical sound or vibration detection system further comprises a rigid substrate coupled to the optical fiber for increasing coupling of sounds from the person into the optical fiber; and wherein the signal processor is configured to identify at least one predetermined signal feature corresponding to a sound associated with a medical condition.

14. The personal medical monitoring device of claim 13, wherein the medical condition comprises one of: cardiac arrhythmia; tachycardia; cardiac arrest; or apnea.

15. A structural vibration detection system, the structural vibration detection system comprising the optical sound or vibration detection system of claim 12, wherein the signal processor is configured to identify at least one predetermined signal feature corresponding to a sound or vibration associated with a specific structural condition.

16. The structural vibration detection system according to claim 15, wherein the specific structural condition comprises a condition associated with a structure comprising one of: a bridge; a building; a vehicle; a rail; or a pipeline.

17. An optical sound or vibration detection system of claim 1, further comprising at least one of:
a flexible membrane coupled to the optical fiber for increasing coupling of sound vibrations incident on the flexible membrane into the optical fiber;
a rigid substrate coupled to the optical fiber for increasing coupling of vibrations into the optical fiber;
a rigid rod having a portion of the optical fiber wrapped around the rigid rod for increasing coupling of vibrations from the rigid rod into the optical fiber;
a sound horn disposed for increasing coupling of sound vibrations incident on a mouth of the sound horn into the optical fiber; or
a resonant structure coupled to the optical fiber for increasing coupling of sound vibrations at a resonant frequency of the resonant structure into the optical fiber.

18. An optical sound or vibration detection system of claim 1, wherein the optical sound detection system comprises one of:
an ultrasonic detector; or
a sonar detector.

19. An ultrasound system, the ultrasound system comprising:
- an ultrasonic generator for generating an ultrasound signal, the ultrasonic generator adapted to transmit an ultrasound signal into a test sample;
- a plurality of optical ultrasonic detectors for detecting portions of the ultrasound signal reflected by the test sample, each optical ultrasonic detector comprising an optical sound or vibration detection system,
- wherein each optical sound or vibration detection system includes:
- a laser source for generating a laser beam;
- an optical fiber comprising:
    - a core that comprises a photoelastically active material;
    - an input coupling port optically coupled to the laser source for coupling the laser beam into the core of the optical fiber; and
    - an output coupling port for emission of laser light propagated through the core; and
- an optical sensor aligned to detect a portion of a diffraction pattern formed by the laser light emitted from the output coupling port of the optical fiber, the optical sensor adapted to produce a signal corresponding to the detected portion of the diffraction pattern; and
- a signal processor;
- wherein the signal processor is configured to process the signals produced by the plurality of optical ultrasonic detectors and to generate an ultrasound image of the test sample.

20. The ultrasound system of claim 19, wherein:
- each optical sensor is configured to detect a power of the detected portion of the diffraction pattern;
- an amplitude of the electrical signal produced by the optical sensor is proportional to the power of the detected portion of the diffraction pattern; and
- the signal processor is configured to process each electrical signal to determine spectral components of the amplitude of the electrical signal.

21. The ultrasound system of claim 19, wherein each optical ultrasonic detector further includes at least one of:
- a rigid substrate coupled to the optical fiber for increasing coupling of a portion of the ultrasound signal reflected by the test sample into the optical fiber;
- a rigid rod having a portion of the optical fiber wrapped around the rigid rod for increasing coupling of the portion of the ultrasound signal reflected by the test sample from the rigid rod into the optical fiber; or
- a resonant structure having a resonant frequency substantially equal to a peak frequency of the ultrasound signal generated by the ultrasonic generator, the resonant structure coupled to the optical fiber for increasing coupling of the portion of the ultrasound signal reflected by the test sample into the optical fiber.

22. An active sonar system, the active sonar system comprising:
- a sonar signal generator for generating and transmitting a sonar signal;
- an optical sound or vibration detection system for detecting reflected portions of the sonar signal,
- wherein the optical sound or vibration detection system includes:
- a laser source for generating a laser beam;
- an optical fiber comprising:
    - a core that comprises a photoelastically active material;
    - an input coupling port optically coupled to the laser source for coupling the laser beam into the core of the optical fiber; and
    - an output coupling port for emission of laser light propagated through the core;
- an optical sensor aligned to detect a portion of a diffraction pattern formed by the laser light emitted from the output coupling port of the optical fiber, the optical sensor adapted to produce a signal corresponding to the detected portion of the diffraction pattern; and
- a signal processor for processing the signal produced by the optical sensor;
- wherein the signal processor is configured to process the signals produced by the optical sound or vibration detection system and to generate a sonar image.

23. An active sonar system according to claim 22, wherein:
- an amplitude of the signal produced by the optical sensor is proportional to the power of the detected portion of the diffraction pattern; and
- the signal processor is adapted to process each signal to determine spectral components of the amplitude of the signal.

* * * * *